Figure 1:
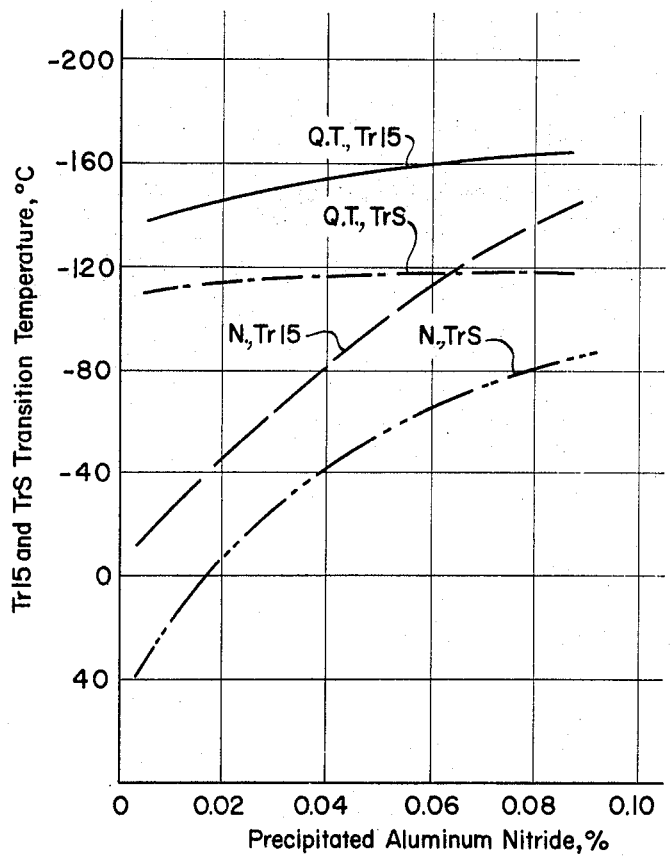

x 4,000

Specimen No. 4.

930°C x 1 hr., air-cooled x 10,000

Specimen No. 4

930°C x 1 hr., air-cooled

INVENTOR.
HAJIME NAKAMURA
BY
*Nolte & Nolte*
ATTORNEYS x 4.000
Specimen No. 4
930°C x 1 hr., water-cooled
650°C x 1.5 hrs., air-cooled x 10.000
Specimen No. 4
930°C x 1 hr., water-cooled
650°C x 1.5 hrs., air-cooled x 4.000

Specimen No. 8

930°C x 1 hr., air-cooled x 10.000

Specimen No. 8

930°C x 1 hr., air-cooled

INVENTOR.
HAJIME NAKAMURA
BY
Nolte & Nolte
ATTORNEYS x 4.000
Specimen No. 8
930°C x 1 hr., water-cooled
650°C x 1.5 hrs., air-cooled x 10.000
Specimen No. 8
930°C x 1 hr., water-cooled
650°C x 1.5 hrs., air-cooled

United States Patent Office 3,249,426
Patented May 3, 1966

3,249,426
LOW-NICKEL DUCTILE STEEL
Hajime Nakamura, Tokyo-to, Japan, assignor to Ishika-wajima-Harima Jukogyo Kabushiki Kaisha, Tokyo-to, Japan, a corporation of Japan
Filed Apr. 20, 1962, Ser. No. 189,209
Claims priority, application Japan, May 16, 1961, 36/17,369
3 Claims. (Cl. 75—124)

It has been known in the art that the addition of Ni is very effective in improving the low temperature toughness or in eliminating the low temperature brittleness of a steel. Thus, in materials for services at a temperature below −40° C., low-Ni steels of 2.5% Ni, 3.5% Ni or 9% Ni grade are in the general use. While, for services at still lower temperatures, high-Ni steels such as an austenitic stainless steel of 18-Cr, 8-Ni class are most commonly used.

However, if the amount of Ni is to be increased in order to obtain a better serviceability at lower temperatures, the price of the steel tends to become so much higher that it is of great importance today to meet a given service requirement with as little Ni as possible.

The present inventor is aware that, if a refinement and uniformity could be realized in the granular structure of steels of plain carbon or low-alloy grade, the low temperature ductility of said steels could be greatly improved, and further, it has been found today, after many inquiries and tests, that the low temperature brittleness of a Ni steel can also always be improved to an extent that is far greater than what is to be expected of the amount of Ni involved therein, by proportioning the amount of precipitated aluminum nitride with respect to that of metallic aluminum in solid solution.

It is an object of present invention to provide a steel which has an excellent ductility at low temperature for a price appreciably lower than that of an existing commercially available steel with comparable composition. Thus, the present invention relates to low-Ni ductile steels consisting of less than about 0.25% carbon, less than about 0.60% silicon, less than about 1.00% manganese, less than about 0.030% phosphorus, less than about 0.030% sulphur, about 1.00 to 4.00% nickel, about 0.02 to 0.12% precipitated aluminum nitride, and less than about 0.15% metallic aluminum in solid solution, the balance substantially all iron with incidental impurities, the percentage being in weight percent, the steel having a granular structure with grain size number larger than No. 9 in terms of the ASTM Ferrite Grain Size Number.

Figure 2:
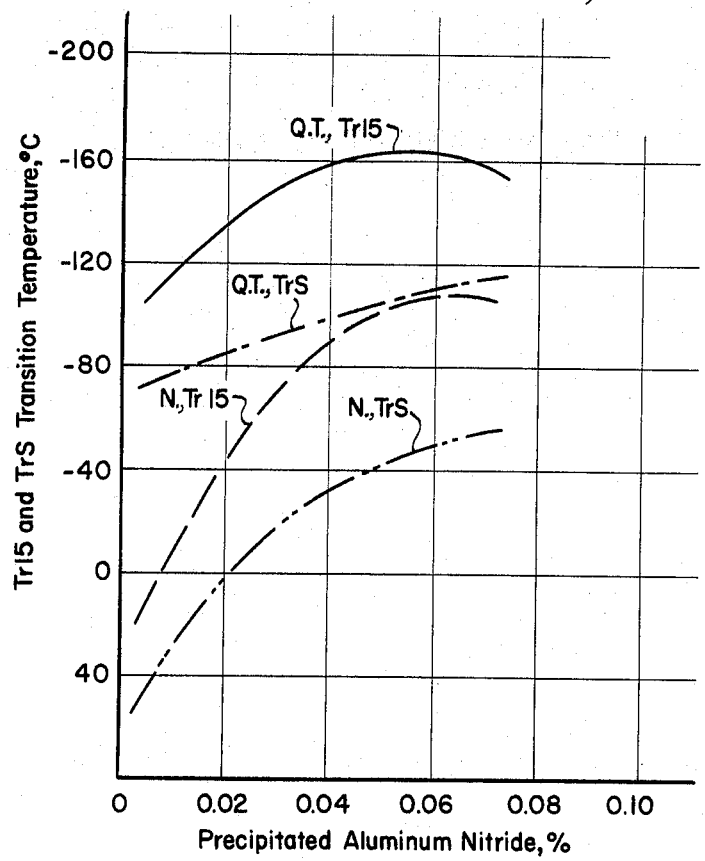
Figure 3:
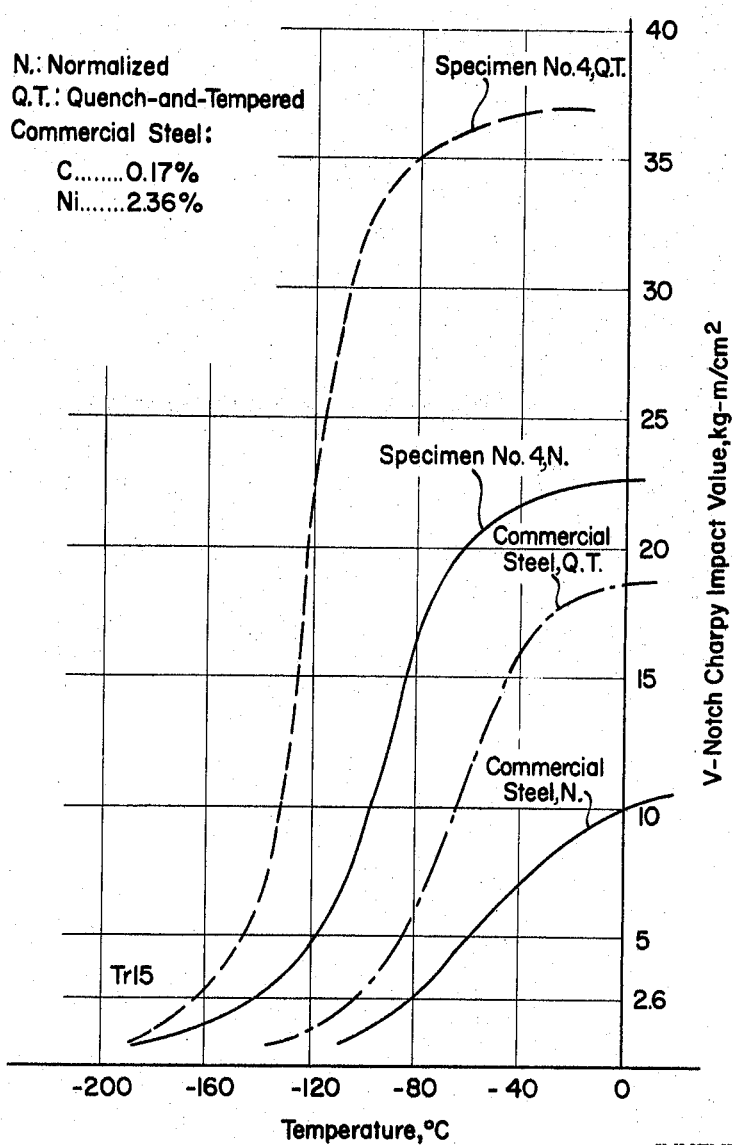
Figure 4:
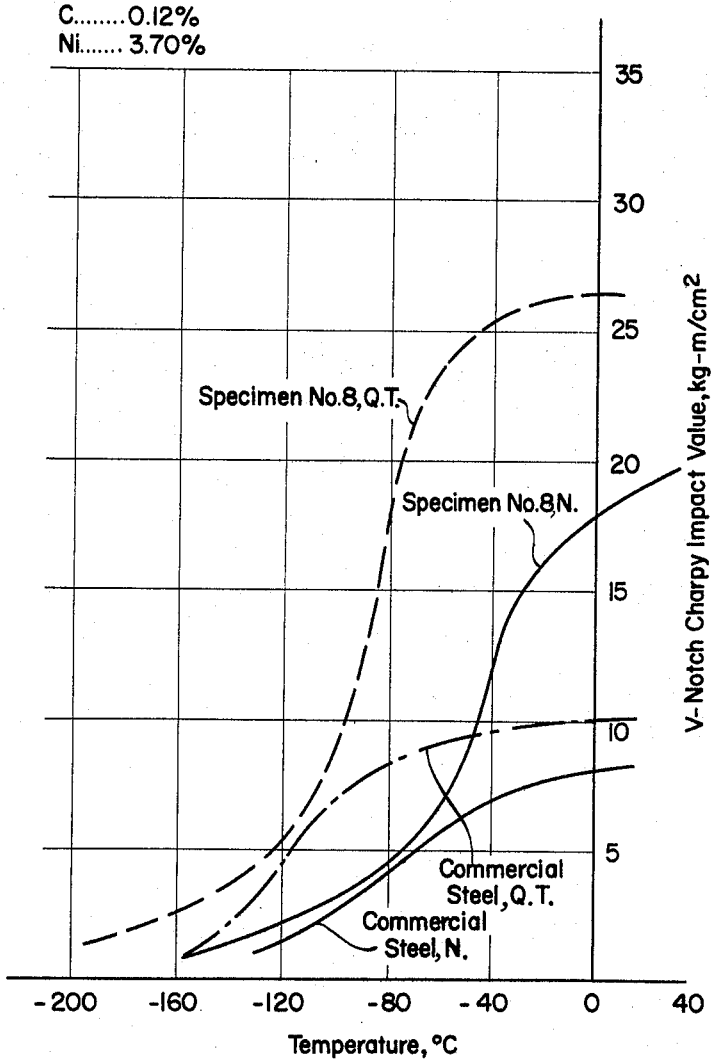
Figure 5:
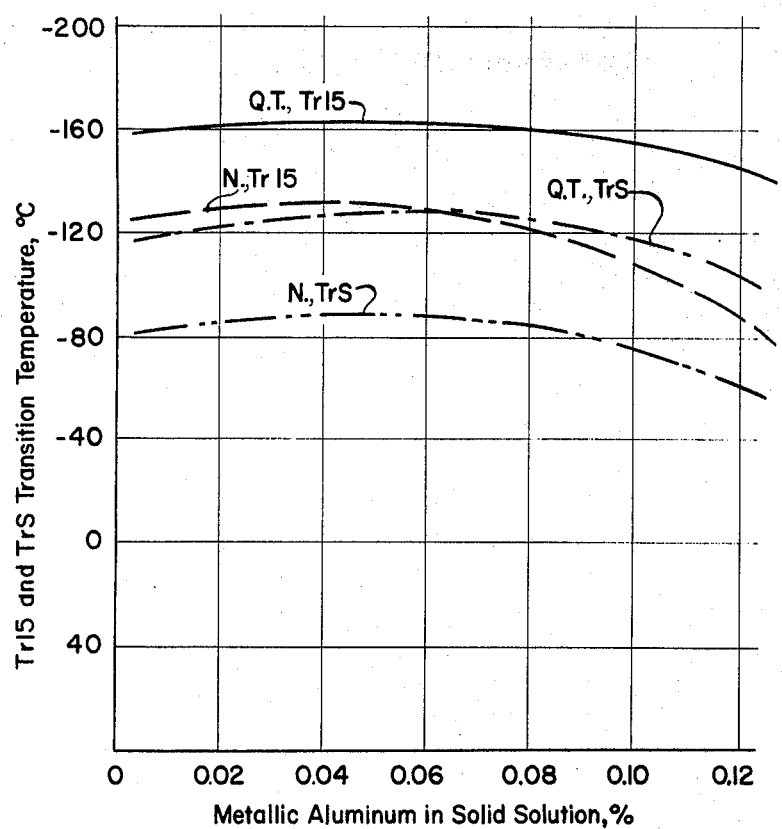
Figure 6:
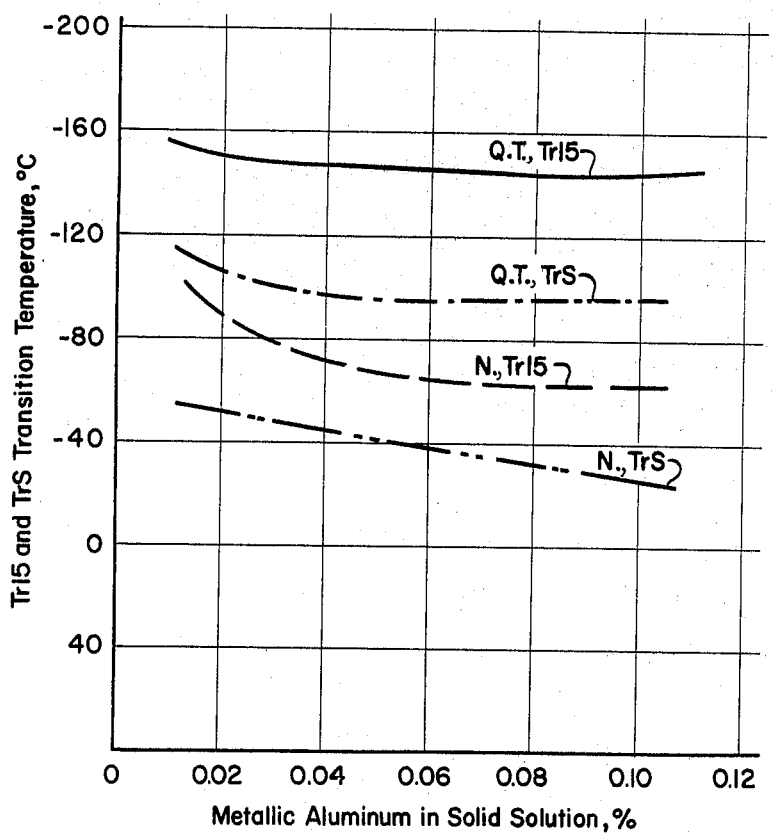
Figure 7:
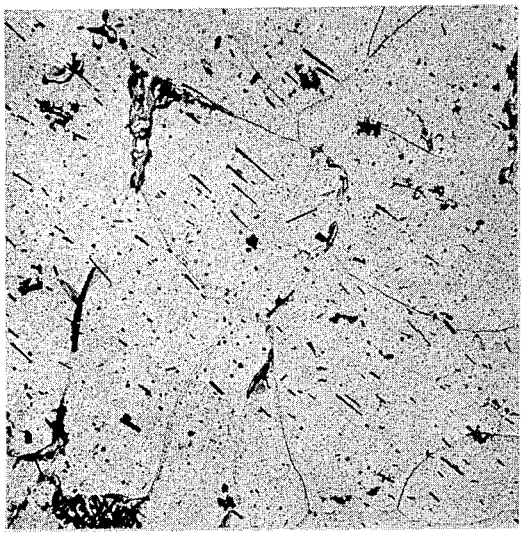
Figure 8:
Figure 9:
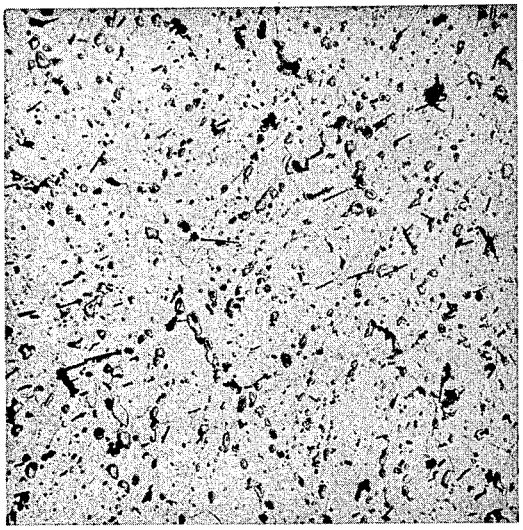
Figure 10:
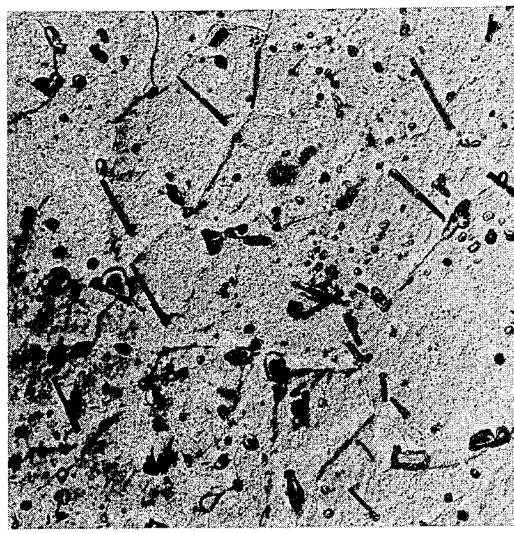
Figure 11:
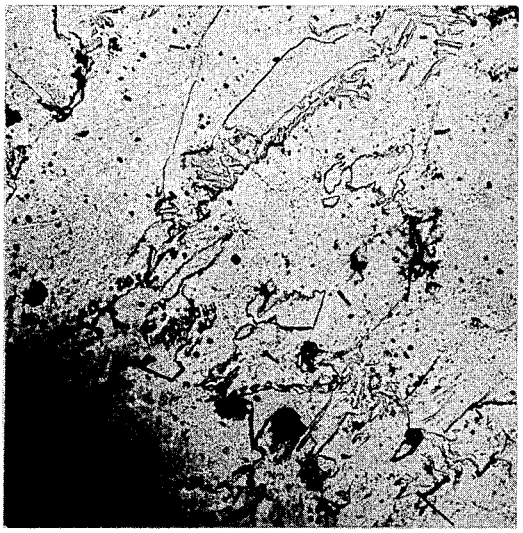
Figure 12:
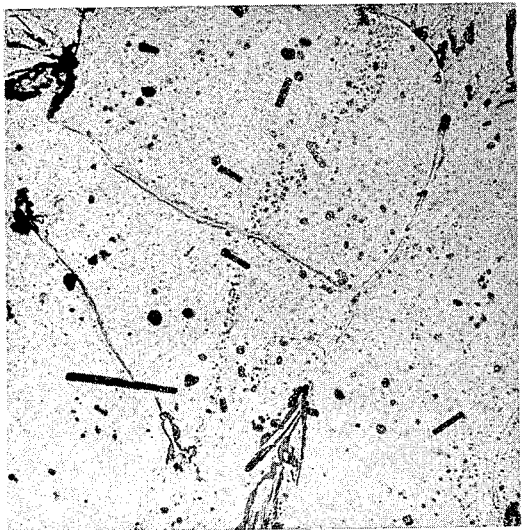
Figure 13:
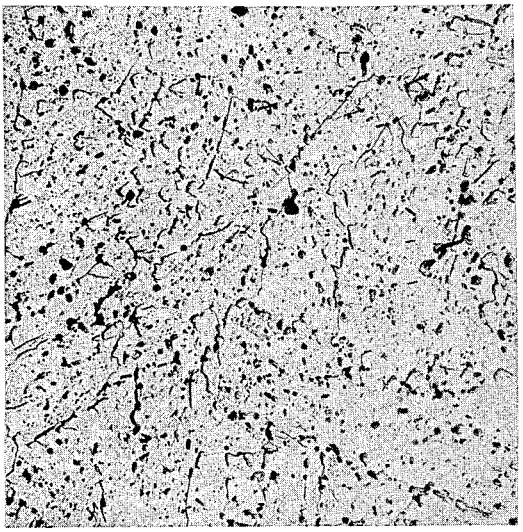
Figure 14:
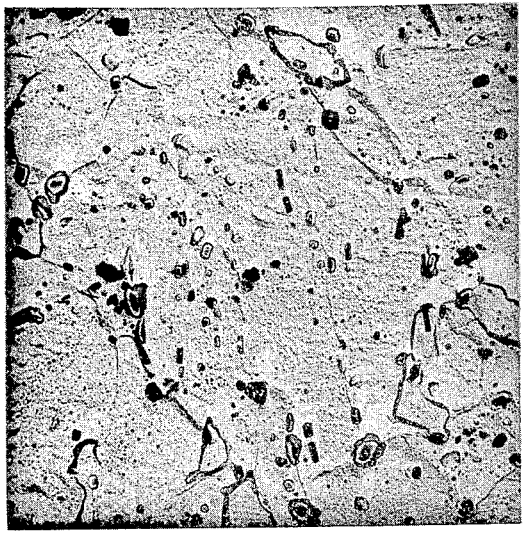

In the following, the principle and scope of the present invention will be disclosed in detail, references being made to drawings and photograms, where, FIG. 1 is a drawing to show the relation between the amount of precipitated aluminum nitride and the 15 ft.-lb. transition temperature as well as the shear fracture transition temperature of a 2.5% Ni grade steel of the present invention in two different states of heat treatment, namely, of normalization and quench-and-tempering, FIG. 2 is a similar drawing but of a 3.5% Ni grade steel of the present invention in like state of heat treatment as above, FIG. 3 is a drawing in which the transition temperature characteristics of a 2.5% Ni grade steel of the present invention is compared with that of a commercially available steel of the same grade in two different states of heat treatment as above, FIG. 4 is a similar drawing but of a 3.5% Ni grade steel of the present invention and of a commercially available same grade steel in the same state of heat treatment as above, FIG. 5 is a drawing to show the relation between the 15 ft.-lb. transition temperature as well as the shear fracture transition temperature and the amount of metallic aluminum in solid solution for a given amount of precipitated aluminum nitride, of a 2.5% Ni grade steel of the present invention in two different states of heat treatment as above, FIG. 6 is a like drawing but of a 3.5% Ni grade steel of the present invention and of a commercially available same grade steel in the same state of heat treatment as above, FIGS. 7 and 8 are electron photomicrograms of a 2.5% Ni grade steel in a state of normalization at magnifications of 4,000× and 10,000×, respectively, FIGS. 9 and 10 are electron photomicrograms of the same steel but in the state of quench-and-tempering at the same magnifications as above, respectively, FIGS. 11 and 12 are electron photomicrograms of a 3.5% Ni grade steel of the present invention in a state of normalization at magnifications of 4,000× and 10,000×, respectively, FIGS. 13 and 14 are electron photomicrograms of the same steel but in the state of quench-and-tempering at the same magnifications as above, respectively.

The chemical compositions of representative 2.5% Ni grade and 3.5% Ni grade steels used in the various experiments are summarized in Table 1. It will be seen that specimens Nos. 1 to 5 represent the 2.5% Ni grade steels and Nos. 6 to 10 represent the 3.5% Ni grade steels.

Table 1

| Specimen No. | C | Si | Mn | P | S | Ni | N | Total Al | AlN | Metallic Al |
|---|---|---|---|---|---|---|---|---|---|---|
| 1 | 0.12 | 0.26 | 0.72 | 0.017 | 0.011 | 2.65 | 0.008 | 0.008 | 0.0028 | |
| 2 | 0.15 | 0.24 | 0.76 | 0.014 | 0.018 | 2.52 | 0.022 | 0.031 | 0.039 | |
| 3 | 0.18 | 0.26 | 0.76 | 0.015 | 0.015 | 2.68 | 0.027 | 0.057 | 0.074 | 0.003 |
| 4 | 0.14 | 0.24 | 0.77 | 0.014 | 0.015 | 2.70 | 0.027 | 0.105 | 0.073 | 0.052 |
| 5 | 0.15 | 0.26 | 0.78 | 0.019 | 0.018 | 2.70 | 0.027 | 0.166 | 0.076 | 0.107 |
| 6 | 0.16 | 0.26 | 0.76 | 0.014 | 0.020 | 3.71 | 0.023 | 0.0063 | 0.0028 | |
| 7 | 0.12 | 0.28 | 0.70 | 0.020 | 0.017 | 3.68 | 0.022 | 0.036 | 0.036 | |
| 8 | 0.14 | 0.27 | 0.77 | 0.015 | 0.020 | 3.45 | 0.027 | 0.067 | 0.071 | 0.011 |
| 9 | 0.15 | 0.29 | 0.76 | 0.016 | 0.021 | 3.58 | 0.027 | 0.112 | 0.078 | 0.042 |
| 10 | 0.15 | 0.30 | 0.76 | 0.021 | 0.025 | 3.72 | 0.026 | 0.168 | 0.073 | 0.101 |

The changes in transition temperature in terms of 15 ft.-lb. level, the $Tr15$ (which will be referred to simply as $Tr15$ hereinafter), versus various amounts of precipitated aluminum nitride, appearing in the above Table 1 as AlN, is illustrated in FIG. 1 for 2.5% Ni grade steels listed in Table 1. Another kind of transition temperatures in terms of 50% crystalline or shear-fracture level, the $TrS$ (which will simply be referred to as $TrS$ hereinafter), of the same steels are also presented in the same figure as a function of the amount of precipitated aluminum nitride. The specimens were heat treated prior to the transition temperature test in either one of two different ways, one involving heating to 930° C. for one hour followed by cooling in air therefrom (this process of heat treatment will simply be referred as "normalization" hereinafter), the other involving heating to 930° C. for one hour followed by rapid cooling in water, then reheating to 650° C. for 1.5 hours followed by cooling in air (which will simply be referred to as "quench-and-tempering" hereinafter).

An improvement or a downward trend is apparent in either of these transition temperatures of $Tr15$ or $TrS$ in that both are shifted toward the lower temperature side as the amount of precipitated aluminum nitride is increased. It may be seen, however, that such is more evident in the case of normalization where the $Tr15$ is lowered from −10° to −131° C. as the amount of precipitated aluminum nitride is increased from 0.0028% to about 0.073%. The improvement in the $TrS$, on the other hand, is from +40° to −78° C. in the same range of changes in the amount of precipitated aluminum nitride. Such reduction of transition temperature is not so great in the case of quench-and-tempering as in the case of normalization. Yet a definite improvement is to be observed in the same figure, in which the $Tr15$ is lowered from −137° to −163° C. for a change in the amount of precipitated aluminum nitride of 0.0028% to about 0.073%, while that in the $TrS$ is from −110° to −118° C. for the same range of precipitated aluminum nitride.

A similar trend was observed also in the change of $Tr15$ and $TrS$ of 3.5% Ni grade steels as may be seen in FIG. 2. Here again, the influence of precipitated aluminum nitride is greater for normalized material in that $Tr15$ is lowered from +25° to −106° C. corresponding to the increasing amount of precipitated aluminum nitride from 0.0028% to about 0.071%, while that in $TrS$ is from +58° to −54° C. over the same range of changes in the amount of precipitated aluminum nitride. The improvement in transition temperatures for quench-and-tempered material is again less, yet a substantial gain is to be noted. Namely, the $Tr15$ is lowered from −102° to −156° C. for the same increment in the amount of precipitated aluminum nitride as above with the lowest or best value of −162° C. at about 0.05% of the latter component, while that in the $TrS$ was −71° to −114° C. over the same range of the latter.

The superiority of low temperature ductility of steels due to the present invention are well demonstrated by FIGS. 3 and 4, in which the transition temperature characteristics of a 2.5% Ni grade steel and a 3.5% Ni grade steel of the present invention are comparatively shown, respectively, with those of commercially available steels of equivalent compositions, respectively, in two different states of heat treatment of normalization and quench-and-tempering. It is to be seen that at any given temperature, the impact strength, as determined by Charpy V-notch test method, of a steel due to the present invention is greater than that of a commercial steel of comparable composition. In terms of the $Tr15$ of the 2.5% Ni grade steels, for example, that of a steel of the present invention in a state of quench-and-tempering is about −165° C., while that of commercial steel in the same state is about −100° C., representing a net improvement of about 65° C. For the same steels but in the normalized state, the $Tr15$ is about −140° C. for the steel of the present invention, and about −80° C. for the commercial steel, the gain being about 60° C. in this case.

The precipitated aluminum nitride which helps to render the steels of the present invention remarkably impact resistant is in a dimension of such a small magnitude that it cannot be detected save by electron microscope. FIGS. 7, 8 and 9, 10 illustrate the ferrite grains of a 2.5% Ni grade steel (specimen No. 4) together with the precipitated aluminum nitride as observed under an electron microscope at magnifications of 4,000× or 10,000×, the stock being in state of either as normalized or as quench-and-tempered, respectively. In the photogram, those rectangular shaped dark bars are the precipitated aluminum nitride. It will be seen in the photograms that the ferrite grain size is smaller in the quench-and-tempered material (FIGS. 9 and 10) than that in the normalized state (FIGS. 7 and 8).

Similar observations were obtained for a 3.5% Ni grade steel (specimen No. 8) as demonstrated by like electron photomicrograms shown in FIGS. 11, 12 and 13, 14, showing dark rectangular objects that are the precipitated aluminum nitride. It is to be noted here again that the ferrite grain size is finer in the quench-and-tempered material (FIGS. 13 and 14) than that in the normalized condition (FIGS. 11 and 12).

Though the effectiveness of such precipitated aluminum nitride is thus evident, it should be noted that if the amount is not sufficient, not only can such excellent low temperature ductility not be expected, but an actual deterioration of that property may occur. This circumstance may be seen by comparatively reviewing FIGS. 3 and 4 with FIGS. 1 and 2, respectively. It will be seen, for instance, that the $Tr15$ value of a commercially available 2.5% Ni grade steel containing 0.17% C., 2.36% Ni and of the order of 0.006% nitrogen, is about −80° C. in a state of normalization (FIG. 3), but that of the specimen No. 1 that contains 0.12% C., 2.65% Ni, 0.023% nitrogen but only 0.0028% precipitated aluminum nitride (Table 1) is merely −10° C. (FIG. 1), although those in quench-and-tempered state are about −100° C. for the former and −137° C. for the latter (FIGS. 3 and 1, respectively). A similar relation is also observable between a commercial 3.5% Ni grade steel containing 0.12% C., 3.70% Ni and of the order of 0.006% nitrogen, and the specimen No. 6 that contains 0.16% C., 3.71% Ni, 0.023% nitrogen but merely 0.0028% precipitated aluminum nitride, in that the $Tr15$ of the former in normalized condition is about −100° C. (FIG. 4) and that of the latter in the same state is +25° C. (FIG. 2), the $Tr15$'s in the quench-and-tempered state are −135° C. for the former (FIG. 4) and −102° C. for the latter (FIG. 2). The harmful effect of nitrogen left free in steel is thus evident here also, as is known in the art.

As has been described heretofore, such harmful effect of nitrogen contained in steel can not only be eliminated by combining it with aluminum into a form of aluminum nitride, but can also actually be made useful in providing the steel with additional increase in the low temperature ductility by precipitating out this aluminum nitride dispersedly and uniformly as seen in FIGS. 1 and 2. However, there exists a certain natural law and an empirical rule to govern such amount of aluminum nitride to be contained in steel matrix.

Firstly, the upper limit is dictated by the natural solubility of nitrogen in molten steel to be about 0.035% maximum, which corresponds to about 0.12% in terms of aluminum nitride. The lower limit is determined by the value of $Tr15$ then to be expected which is customarily put at the −40° to −50° C. range by various industrial specifications such as, for instance, the Standard due to the American Society for Testing Material (ASTM A 300-58). Such $Tr15$ value is to be obtained from steels due to the present invention at an amount of precipitated aluminum nitride of about 0.02% as may be judged by FIGS. 1 and 2.

Such very favorable effect of precipitated aluminum nitride, however, is not to be expected unless all, or at least the substantial portion of, the nitrogen is caught and combined by aluminum, as described in the preceding paragraphs in connection with the harmful effect of free nitrogen. An excessive addition of aluminum for a purpose of eliminating all the nitrogen to trace, on the other hand, will again result in the rise of the transition temperature, for excessive aluminum then contained in the matrix as in solid solution gives rise to coarsening of the ferrite grains. The circumstance described above may be well understood by FIGS. 5 and 6, in which the changes in the Tr15 values with increasing amount of metallic aluminum in solid solution are illustrated for 2.5% Ni and 3.5% Ni grade steels, respectively, in two states of heat treatment of normalization and quench-and-tempering. In these cases, the amount of precipitated aluminum nitride was kept constant at about 0.07% level. It will be seen that for Tr15's of −80° C. and −120° C. for 2.5% Ni grade in states of normalization and quench-and-tempering, respectively, given in accordance with the current practices of specifications, the corresponding values for metallic aluminum in solid solution are 0.13% and 0.15%, respectively. At the 3.5% Ni grade, the normally specified Tr15 is −100° C. for normalized material and −140° C. for quench-and-tempered stock, and the corresponding amount of precipitated aluminum nitride is 0.014% for the former case and about 0.2% for the latter. Therefore, a limiting value of about 0.15% is indicated for metallic aluminum in solid solution.

Although a number of examples have been described heretofore with respect to grades of 2.5% Ni and 3.5% Ni only, it should be evident that the principle of the present invention is not to be restricted to those specific examples, but to be considered as applicable to all and general so-called low-nickel grade containing less than about 0.25% carbon, less than about 0.6% silicon, less than about 1.00% manganese, less than about 0.030% phosphorus and sulphur each, about 1.00 to 4.00% nickel. It should be evident further that by prescribing and proportioning the respective amounts of precipitated aluminum nitride and metallic aluminum in solid solution to about 0.02 to 0.12% and less than 0.15%, respectively, any and all the so-called low-nickel grade steels can be remarkably improved with regard to low temperature ductility, and the grain size thereof can be greatly refined so as to be larger than No. 9 in terms of the ASTM Ferrite Grain Size Number.

I claim:
1. A structural steel consisting of less than 0.25% carbon, less than 0.60% silicon, less than 1.00% manganese, less than 0.030% phosphorus and sulphur each, 1.00 to 4.00% nickel, 0.02 to 0.12% precipitated aluminum nitride, less than 0.15% metallic aluminum in solid solution, the balance substantially all iron with incidental impurities, the steel having a granular structure with grain size number larger than No. 9 in terms of the ASTM Ferrite Grain Size Number.

2. A method of heat treatment for the steel according to claim 1, consisting of rapidly cooling in air or water, the starting temperature being a temperature above the $A_3$ transformation temperature and within the temperature range for fast precipitation of aluminum nitride.

3. The method according to claim 2 wherein the step of tempering at a temperature between 150° C. and $A_1$ transformation temperature follows the rapid cooling.

References Cited by the Examiner

Alloys of Iron and Nickel, vol. 1, pages 398, and 399. Edited by Marsh, published in 1939 by the McGraw-Hill Book Company, New York.

Bureau of Standards Journal of Research, vol. 48, pp. 193 to 199.

HYLAND BIZOT, *Primary Examiner.*

DAVID L. RECK, *Examiner.*

P. WEINSTEIN, *Assistant Examiner.*